United States Patent
Domani et al.

(10) Patent No.: US 10,940,527 B2
(45) Date of Patent: Mar. 9, 2021

(54) MANUFACTURING PROCESS, TOOL STAND, AND DRILL BIT

(71) Applicant: Hilti Aktiengesellschaft, Schaan (LI)

(72) Inventors: Guenter Domani, Weissensberg (DE); Carsten Peters, Sax (CH); Florian Schroeder, Maienfeld (CH)

(73) Assignee: Hilti Aktiengesellschaft, Schaan (LI)

( * ) Notice: Subject to any disclaimer, the term of this patent is extended or adjusted under 35 U.S.C. 154(b) by 30 days.

(21) Appl. No.: 16/062,537

(22) PCT Filed: Dec. 6, 2016

(86) PCT No.: PCT/EP2016/079815
§ 371 (c)(1),
(2) Date: Jun. 14, 2018

(87) PCT Pub. No.: WO2017/102417
PCT Pub. Date: Jun. 22, 2017

(65) Prior Publication Data
US 2019/0015892 A1  Jan. 17, 2019

(30) Foreign Application Priority Data

Dec. 15, 2015 (EP) .................................. 15200036

(51) Int. Cl.
*B21K 5/04* (2006.01)
*B23B 51/02* (2006.01)
(Continued)

(52) U.S. Cl.
CPC ............... *B21K 5/04* (2013.01); *B23B 51/02* (2013.01); *B23P 15/32* (2013.01); *E21B 10/445* (2013.01);
(Continued)

(58) Field of Classification Search
CPC .......... B21D 11/14; B21H 7/187; B21K 5/04; B23B 2226/75; B23B 2251/046; B23B 51/02; B23P 15/32; E21B 10/445
See application file for complete search history.

(56) References Cited

U.S. PATENT DOCUMENTS

| | | | | |
|---|---|---|---|---|
| 1,395,617 A | * | 11/1921 | Stubbs | B21D 11/14 72/64 |
| RE16,768 E | * | 10/1927 | Leidecker | B21K 5/04 72/64 |

(Continued)

FOREIGN PATENT DOCUMENTS

| DE | 456723 C | 2/1928 |
|---|---|---|
| DE | 1 943 586 A1 | 3/1971 |

(Continued)

OTHER PUBLICATIONS

PCT/EP2016/079815, International Search Report (PCT/ISA/220) dated Feb. 6, 2017, with partial English translation, enclosing Written Opinion of the International Searching Authority (PCT/ISA/237) (Seventeen (17) pages).

*Primary Examiner* — Stephen Choi
(74) *Attorney, Agent, or Firm* — Crowell & Moring LLP

(57) ABSTRACT

A method for producing a drill includes cold forming of a rod-shaped blank to form a semifinished product having three or more rectilinear longitudinal ribs extending along a longitudinal axis of the semifinished product, introducing the longitudinal ribs into a first die and a second die in a working direction, where the first die bears against the longitudinal ribs in a direction of rotation about the longitudinal axis and the second die bears against the longitudinal ribs counter to the direction of rotation, pivoting the first die in the direction of rotation in relation to the second die in order to twist the longitudinal ribs between the first and second dies, pulling the longitudinal ribs 31 through the (Continued)

pivoted first die and the second die counter to the working direction in order to twist the longitudinal ribs and apply a drill head to the rear end in the working direction.

2 Claims, 5 Drawing Sheets

(51) Int. Cl.
  *B23P 15/32* (2006.01)
  *E21B 10/44* (2006.01)
  *B21D 11/14* (2006.01)
  *B21H 7/18* (2006.01)
(52) U.S. Cl.
  CPC .............. *B21D 11/14* (2013.01); *B21H 7/187* (2013.01); *B23B 2226/75* (2013.01); *B23B 2251/046* (2013.01)

(56) References Cited

U.S. PATENT DOCUMENTS

2013/0302101 A1* 11/2013 Scanlon .................. B23B 51/06
                                                                408/59
2018/0171721 A1* 6/2018 Domani .................. B23B 51/02

FOREIGN PATENT DOCUMENTS

DE     10 2008 024 017 A1    11/2009
SU              1459762 A1 *   2/1989
WO     WO 2016/202768 A1     12/2016

* cited by examiner

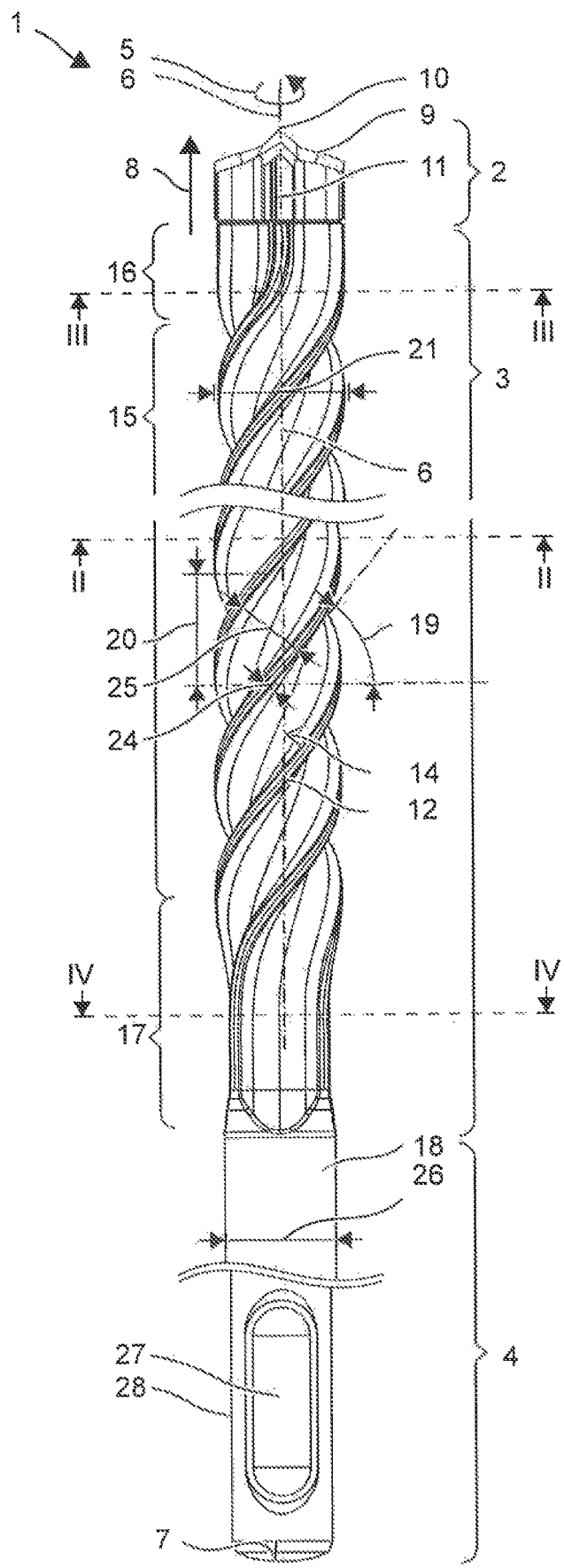
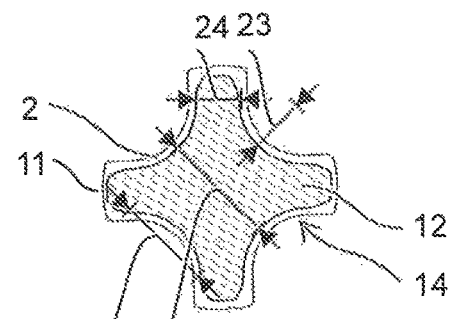
Fig. 3
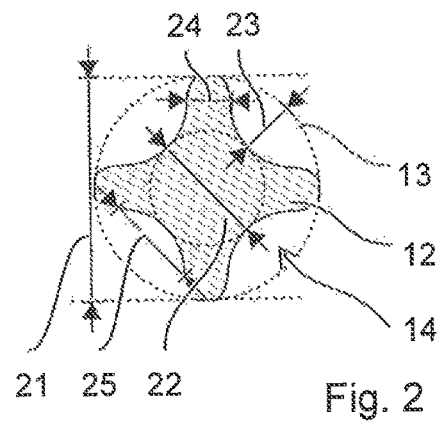
Fig. 2
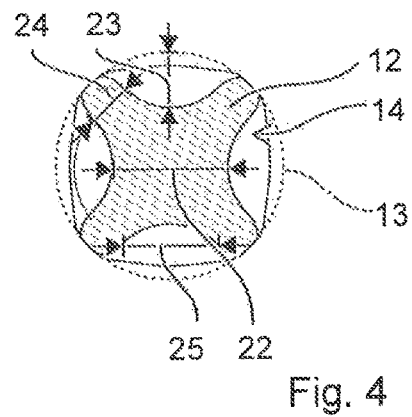
Fig. 4
Fig. 1

MANUFACTURING PROCESS, TOOL STAND, AND DRILL BIT

CROSS REFERENCE TO RELATED APPLICATIONS

This application claims the priority of International Application No. PCT/EP2016/079815, filed Dec. 6, 2016, and European Patent Document No. 15200036.0, filed Dec. 15, 2015, the disclosures of which are expressly incorporated by reference herein.

BACKGROUND AND SUMMARY OF THE INVENTION

The present invention involves a production method for drill bits plus a drill bit and a tool stand for carrying out a production method for a drill bit.

The inventive production method for a drill bit with a helix has the following steps: cold reshaping of a rod-shaped blank to form a semifinished product with three or more rectilinear longitudinal ribs extending along the longitudinal axis of the semifinished product; introducing the longitudinal ribs of the semifinished product in a first die and a second die in the working direction, whereby the first die bears against the longitudinal ribs in the direction of rotation around the longitudinal axis and the second die bears against the longitudinal ribs counter to the direction of rotation; pivoting the first die in the direction of rotation in relation to the second die in order to twist the longitudinal ribs between the first die and the second die; pulling the longitudinal ribs of the semifinished product through the pivoted first die and the second die counter to the working direction in order to twist the longitudinal ribs; and attaching a drill head to the back end in the working direction.

The inventive process makes a high level of automation possible when manufacturing drill helixes of any length and with a variable helix gradient.

An inventive tool stand for producing a helix for a drill bit has a first die and a second die arranged one after the other in the working direction on a working axis. The first die has a star-shaped hollow cross section on the front side that faces away from the second die that corresponds to the inverse shape of the cross section of the helix of the drill bit. The second die has a star-shaped hollow cross section that corresponds to the inverse shape of the cross section of the helix of the drill bit. A pivoting drive can pivot the first die in relation to the second die in a basic position in which the star-shaped hollow cross section of the front side of the first die and the star-shaped hollow cross section of the second die have the same orientation. The pivoting drive can then pivot the first die from the basic position around a pivoting angle in the direction of rotation. An axial drive can pull a semifinished product out of the first die and the second die along the working axis.

In a preferred embodiment, the hollow cross section of the first die increases in size longitudinal to the working direction—at least counter to the direction of rotation. The fact that the cross section increases in size allows the shaping process of the first die to proceed with greater stability with a longer length, i.e., the dimension along the working axis.

The following description explains the invention on the basis of embodiment examples and Figures.

BRIEF DESCRIPTION OF THE DRAWINGS

FIG. 1: a drill bit;
FIG. 2: a cross section through a conveyance area of the drill bit at level II-II;
FIG. 3: a cross section through an attachment area of the drill bit at level III-III;
FIG. 4: a cross section through a discharge area of the drill bit at level IV-IV.

DETAILED DESCRIPTION OF THE DRAWINGS

Figure 5:
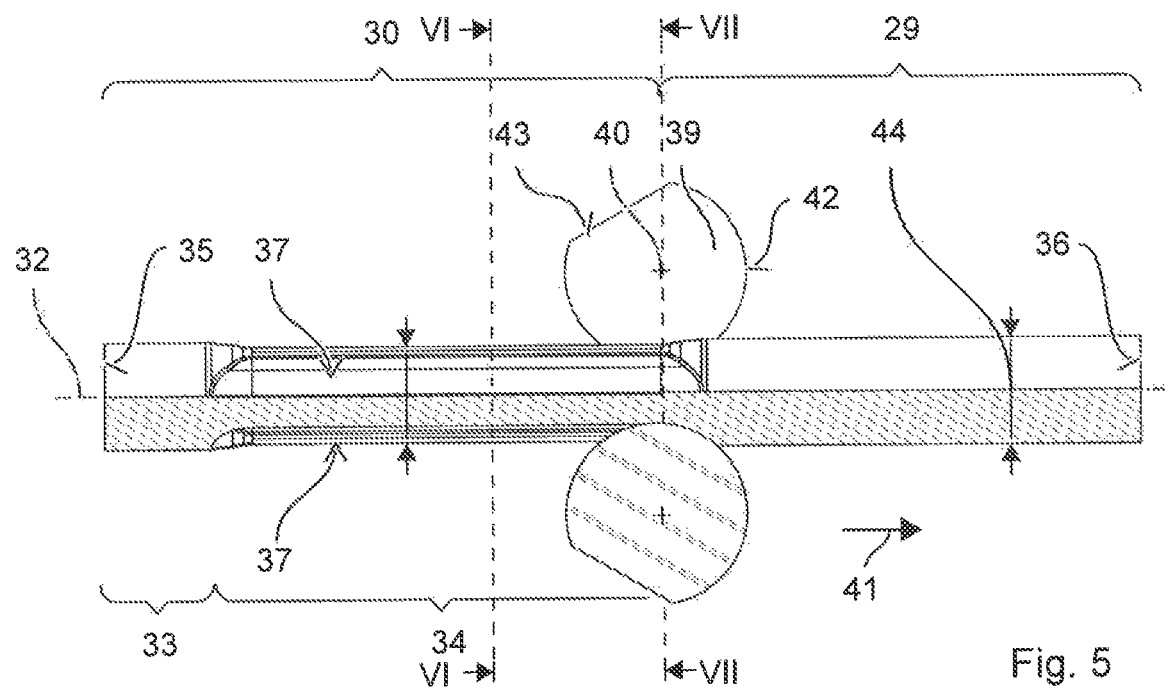
FIG. 5: a schematic diagram of the process of reworking a blank to form a semifinished product.

Unless otherwise indicated, elements that are identical or have the same function are identified using the same reference numbers in the Figures shown.

FIG. 1 shows a sample drill bit 1. The drill bit 1 has a drill head 2, a helix 3, and a shank end 4. For example, the drill bit 1 is designed for removing mineral materials, e.g., reinforced concrete. During operation, the drill bit 1 is spun in the direction of rotation 5 around its longitudinal axis 6 (drill bit axis). To do this, the drill bit 1 can be inserted into a handheld power tool that has a corresponding rotary drive. A hammer mechanism of the handheld power tool periodically strikes the free end 7 of the shank end 4. The shock wave of the impacts passes through the helix 3 in the impact direction 8 to the drill head 2. The drill head 2 shatters the material. For one thing, the rotary motion ensures that the drill head 2 strikes the base in different positions, resulting in a bore hole that is evenly formed; for another, the helix 3 causes the drill cuttings to be carried away.

The drill head 2 in the example has four chisel edges 9. The chisel edges 9 come together at a tip 10 on the drill bit axis 6. The tip 10 is preferably the highest point in the impact direction 8 and therefore is what first comes into contact with the material. The chisel edges 9 can rise in a radial direction from the outside to the drill bit axis 6 along the impact direction 8. The chisel edges 9 are all oriented towards the impact direction 8. The chisel edges 9 each consist of a leading facet that moves in the direction of rotation and a following facet, both of which are oriented in the impact direction 8. The two facets are inclined towards each other; the top angle of the chisel edge 9 is greater than 45 degrees, preferably greater than 60 degrees, and less than 120 degrees. The chisel edges 9 can all be designed the same, or each pair can be different from each other. The drill bit head 2 has four break-off edges 11 that extend parallel to the drill bit axis 6. The break-off edges 11 merge with the chisel edges 9. The break-off edges 11 define the diameter of the drill bit head 2. The number of chisel edges 9 and break-off edges 11 can be selected depending on the diameter of the drill bit 1. For example, a drill bit 1 that has a drill bit head 2 with a small diameter can have two chisel edges 9, while a drill bit head 2 with a large diameter can have more than four chisel edges 9 and a corresponding number of break-off edges 11.

The drill bit head 2 is preferably made of a sintered material, specifically tungsten carbide. The chisel edges 9 and the break-off edges 11 are preferably joined together monolithically, specifically without a joint zone.

For example, the helix 3 of the drill bit 1 has four helix ribs 12. The number of helix ribs 12 is preferably the same as the number of chisel edges 9. The helix ribs 12 extend along the drill bit axis 6 and multiple times around this drill bit axis 6. The helix ribs 12 form a cylindrical envelope 13 when the drill bit 1 spins. Adjoining helix ribs 12 each have a helix groove 14 between them that is regarded as geometrically bordered by the envelope 13 in a radial direction. The drill cuttings are transported in the helix grooves 14 by the helix ribs 12 along the drill bit axis 6.

The helix 3 has different sections along the drill bit axis 6 that have various gradients for the helix ribs 12 in order to handle different requirements. A conveyance area 15 is the dominant section and is for conveying the drill cuttings. The conveyance area 15 typically extends along more than 80% of the length of the helix 3. The conveyance area 15 can be right next to the drill bit head 2; alternatively, there can be an attachment area 16 between the drill bit head 2 and the drill bit head 2 that is designed for the special requirements for attaching the drill bit head 2 to the helix 3. The helix 3 ends with a discharge area 17 at the end 7 pointed towards its shank end 4. The discharge area 17 merges with the cylindrical shaft 18 of the shank end 4.

There is a helix gradient 19 of the helix ribs 12 in the conveyance area 15; in other words, the helix ribs 12 are sloped in comparison to a level perpendicular to the drill bit axis 6, ranging from 35 degrees to 70 degrees. The helix gradient 19 of the helix ribs 12 is preferably constant along the entire conveyance range 15. The constant helix gradient 19 ensures that the drill cuttings are transported uniformly in the helix 3. The constant helix gradient 19 results in a constant pitch 20 of the helix 3. In an alternative design, the helix gradient 19 and the pitch 20 can increase in the impact direction 8. Along the drill bit axis 6 in the conveyance area 15, the helix 3 has a cross section (FIG. 2) that remains uniform and spins continuously around the drill bit axis 6. The cross section can be described by the helix diameter 21, a core diameter 22, the height of the helix ribs 12 and the depth 23 of the helix grooves 14, the average thickness 24 of the helix ribs 12, and the average width 25 of the helix grooves 14, among other characteristics. The helix diameter 21 is the diameter of the drill bit 1 or the envelope 13 of the helix 3, i.e., the smallest hollow cylinder in which the helix 3 can be spun around its drill bit axis 6. The core diameter 22 is the diameter of the largest circle that can fit completely in the cross section of the helix 3. The average thickness 24 and the average width 25 can be determined halfway along the helix ribs 12, for example. The core diameter 22, the height of the helix ribs 12, and the depth 23 of the helix grooves 14 remain constant along the entire conveyance area 15. Preferably, the average thickness 24 of the helix ribs 12 and the average area 25 of the helix grooves 14 remain constant along the entire conveyance area 15 as well.

In the sample drill bit 1 shown, the conveyance area 15 merges with the attachment area 16 in the impact direction 8. The drill bit head 2 is soldered or welded preferably onto the level end surface of the attachment area 16. The helix gradient 19 constantly increases in the attachment area 16 in the direction of the drill bit head 2. The helix gradient 19 preferably transitions to an orientation parallel to the drill bit axis 6; in other words, the helix gradient 19 reaches 90 degrees. The cross section of the helix 3 in the attachment area 16 can remain constant along its entire length (shown enlarged in FIG. 3). Preferably, the cross section of the attachment area 16 is congruent with the cross section in the conveyance area 15. In particular, the core diameter 22, the height of the helix ribs 12, and the depth 23 of the helix grooves 14 preferably remain the same. The surfaces of the helix ribs 12 and the helix grooves 14 are smooth—in particular, they lack the roughness and scoring typical of cutting processes.

The transition from the helix gradient 19 in the conveyance area 15 to the parallel orientation at the drill bit head 2 is continuous and preferably with a uniform rate of change in the helix gradient 19 along the impact direction 8. The helix gradient 19 preferably increases in the range of between 0.5 degrees and 2 degrees for every degree that the helix rib 12 winds around the drill bit axis 6. The rate of change is minimal and constant throughout; the helix 3 does not exhibit any points or otherwise abrupt changes in the helix gradient 19.

In the discharge area 17 of the helix 3, the helix ribs 12 transition from the conveyance area 15 to the cylindrical shank end 4. The helix gradient 19 preferably increases continuously in the discharge area 17 until the helix ribs 12 extend parallel to the drill bit axis 6. The cross section of the helix 3 can remain the same until the helix ribs 12 are oriented parallel to the drill bit axis 6 (shown enlarged in FIG. 4). Then the cross section changes constantly counter to the impact direction 8 to form a circle with the diameter 26 of the shank end 4, i.e., the cross section of the shank end 4. The helix ribs 12 become flatter and have shrinking radial dimensions; the helix grooves 14 become flatter and increase in a radial direction.

The transition from the helix gradient 19 in the conveyance area 15 to the parallel orientation at the discharge area 17 is continuous and preferably with a uniform rate of change of the helix gradient 19 counter to the impact direction 8. The helix gradient 19 preferably increases between 0.5 degrees and 2 degrees for each degree that the helix rib 12 winds around the drill bit axis 6.

The shank end 4 of the drill bit 1 in the example is designed for the use of handheld manual power turning tools. The shank end 4 essentially has a cylindrical shape with a diameter 26. The shank end 4 has two closed grooves 27 in which locking elements of the manual power tool can engage from the radial side and slide along the drill bit axis 6. Grooves 28 oriented along the drill bit axis 6 allow torque to be applied by the manual power tool.

Figure 8:
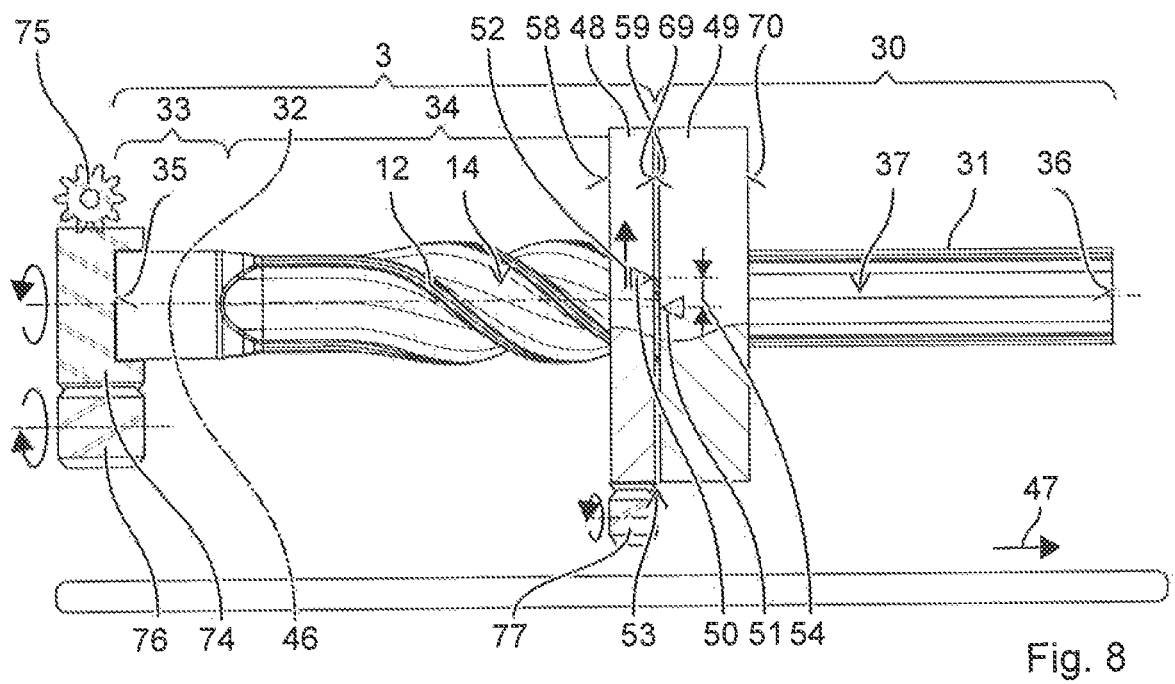
FIG. 8: a schematic diagram of the process of reworking a semifinished product to form a helix.

A manufacturing process of the sample drill bit 1 involves two, preferably immediately consecutive process steps. An initial cold reshaping process is used to reshape a blank 29 to form a semifinished product 30 with longitudinal ribs 31 (FIG. 5). The longitudinal ribs 31 created in this way are twisted into a helix 3 in a second cold reshaping process (FIG. 8). Subsequently, a drill bit head 2 is attached.

For example, a manufacturing process starts with a rod-shaped blank 29. The blank 29 has a simple cylindrical or convex prismatic shape. The cross section preferably has a circular, slightly elliptical, or convex polygonal shape, e.g., hexagonal, that is perpendicular to the longitudinal axis 32 of the blank 29. The cross section is preferably constant along the entire length of the blank 29. The blank 29 preferably has a cross-sectional area that is around the same or up to 50% larger than the cross-sectional area of the helix 3. The length of the blank 29 is the same or up to 20% shorter than the length of the drill bit 1 without the drill bit head 2, i.e., the total length of the helix 3 and the shank end 4. The blank 29 is preferably made of a low-alloy steel.

Figure 6:
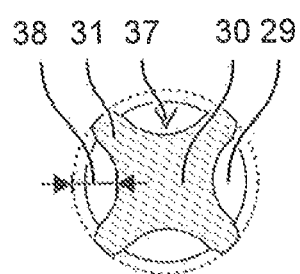
FIG. 6: a cross section through the semifinished product at level VI-VI.
Figure 7:
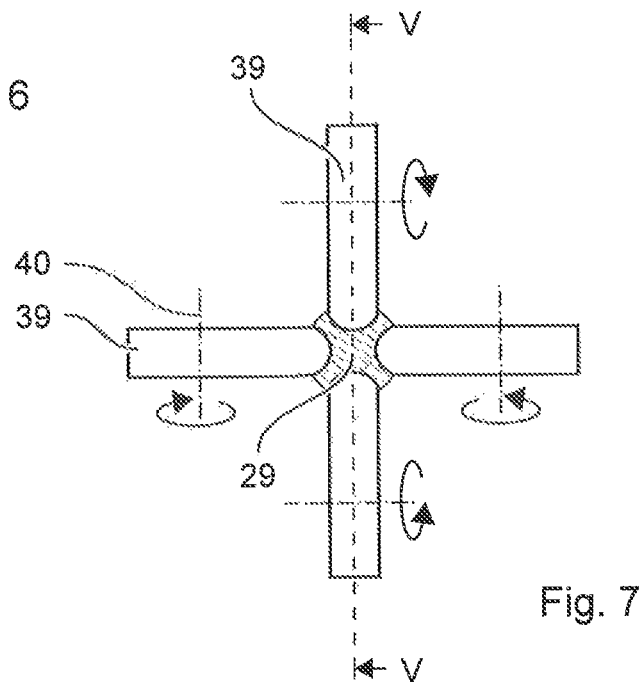
FIG. 7: a cross section through a roller stand at level VII-VII.

The blank 29 is conveyed to a first roller stand and cold reshaped to form a semifinished product 30. FIG. 5 shows the original blank 29 on the right and the semifinished product 30 produced from the blank 29 on the left. The semifinished product 30 is divided up into a connected, restructured section 33 and a connected, star-shaped structured (star) section 34. In this context, restructured means unchanged by the process described below in comparison to the original shape of the blank 29. Therefore, the restructured section 33 essentially continues to be cylindrical or convex prismatic in form. The star-shaped structured section 34 can be obtained by means of the process described below. The star shape of the star-shaped structured section 34 refers to its cross section (FIG. 6) perpendicular to its longitudinal axis 32. The cross section has the shape of a star, preferably a regular star. A star is a polygon with alternating concave corners, i.e., an interior angle of more than 180 degrees, and convex corners (points), i.e., an interior angle of less than 180 degrees. The corners are typically rounded or flattened here. The face of the semifinished product 30 that is formed by the restructured section 33 is referred to below as the front face 35, and the face of the semifinished product 30 that is formed by the star-shaped section 34 is referred to below as the back face 36.

The star-shaped section 34 of the semifinished product 30 has three or more longitudinal ribs 31 plus longitudinal grooves 37 arranged between the adjoining longitudinal ribs 31. The longitudinal ribs 31 and the longitudinal grooves 37 extend parallel to the longitudinal axis 32 of the semifinished product 30. The star-shaped section 34 has a constant star-shaped cross section along the longitudinal axis 32 of the semifinished product 30 (shown enlarged in FIG. 6)—except for a short transitional area leading to the unstructured section 33. The longitudinal ribs 31 and the longitudinal grooves 37 start at the front face 36 of the semifinished product 30; therefore, the longitudinal grooves 37 are open at the front face 36. The longitudinal ribs 31 are distributed uniformly around the longitudinal axis 32. For example, the four longitudinal ribs 31 are arranged at angular distances of 90 degrees. The longitudinal ribs 31 in the example all have the same radial dimension (height). In an arrangement with an even number of longitudinal ribs, the longitudinal ribs of a pair of diametrically opposed longitudinal ribs each have the same height; however, the height of two circumferentially adjacent longitudinal ribs 31 may be different. The depth 38 of the longitudinal grooves 37 corresponds to the depth 23 of the helix 3 that is being produced.

Preferably, the semifinished product 30 is longitudinally rolled. A roller stand has multiple rollers 39 that roll parallel to the longitudinal axis 32 of the blank 29. The rollers 39 rotate around the rotary axes 40 perpendicular to the longitudinal axis 32. The rollers 39 generate the longitudinal grooves 37 in the semifinished product 30 that are parallel to the longitudinal axis 32. The material displaced during rolling 39 forms a longitudinal rib 31 parallel to the longitudinal axis 32 between each of the adjacent longitudinal grooves 37. The unstructured section 33 of the blank 29 remains unchanged and forms the basis for the shank end 4.

The blank 29 is cold reshaped to form the semifinished product 30. The blank 29 is at room temperature when it is fed into the rollers 39. The blank 29 may warm up somewhat due to the rolling process, but its temperature remains well below the recrystallization temperature of steel. Typically, the rolling process 39 takes place at a temperature of 10 degrees Centigrade (° C.) to 80° C. The surface of the structured section 34 is hardened through the cold reshaping and ends up with less ductility than the blank 29.

A sample roller stand has a roller 39 for each of the longitudinal grooves 37, of which there are four here in this example. An alternative roller stand can generate two longitudinal grooves at the same time and consequently only has half as many rollers. The rollers 39 can be positioned in such a way that the blank 29 can be inserted between the rollers 39 up to a starting point without it being reshaped. The rolling process 39 for the longitudinal grooves 37 begins at the starting point between the front face 35 and the back face 36 and runs in a rolling direction 41 from the starting point to the back face 36. The section 33 between the front face 35 and the starting point remains unstructured. The section 34 between the starting point and the back face 36 has a star-shaped structure. The rolling process 39 begins with the closed ends of the longitudinal grooves 37 and ends with the open ends of the longitudinal grooves 37. During the rolling process 39, the blank 29 is moved through the rollers 39 counter to the rolling direction 41 in relation to the roller stand.

The rollers 39 in the example have a circular segment 42 for reshaping the blank 29 and a flat segment 43 along their circumference. The rollers 39 are oriented with the flat segments 43 facing the blank 29 in order to insert the blank 29. The distance of the flat segments to the longitudinal axis 32 is greater than half the diameter 44 (radius) of the blank 29 so that the blank 29 is inserted between the rollers 39 along the longitudinal axis 32 without touching the rollers 39. The blank 29 is positioned after the rollers 39 with the section 33 that is not to be machined in the feed direction 41. The rollers 39 are engaged with the blank 29 in order to reshape the blank 29 to form the semifinished product 30. With the rollers 39 in the example, this occurs by means of simple pivoting around the axis 40 of the rollers 39. The rollers 39 generate the longitudinal grooves 37 and the longitudinal ribs 31. The rolling process continues until the semifinished product 30 is ejected by the rollers 39, whereby the longitudinal grooves 37 formed are open at the front end 36 in the feed direction 41.

The rolling process 39 of the longitudinal grooves 37 can also be begun with the back face 36, or the open end of the longitudinal grooves 37. The blank 29 is introduced in the rolling direction 41 and reshaped in the process until the rollers 39 reach the section 33. The rollers 39 are pivoted into the non-reshaping position, and the semifinished product 30 is removed.

As an alternative to rolling, the longitudinal grooves can be produced in the blank by means of extrusion. A die has a funnel-shaped, tapered opening. The opening tapers down to a star-shaped cross section that corresponds to the complementary or inverse shape of the structured section of the semifinished product. The funnel shape of the die can be complementary to the transitional area; preferably, the die is as long as the transitional area. A groove base preferably rises continuously in the transitional area. The shape of the groove base can rise along the axis with the shape of a circle segment or rectilinearly. The extrusion process takes place at room temperature.

The longitudinal grooves 37 and the longitudinal ribs 31 of the semifinished product 30 are then twisted in a second tool stand. FIG. 8 shows a schematic diagram of the semifinished product 30 while the second tool is shaping the helix 3 in the semifinished product 30. The second tool has a (reshaping) die 48 (FIG. 9) followed by a (supporting) die 49 (FIG. 10) on the working axis 46 and along the working direction 47.

The reshaping die 48 has its narrowest point along the working axis 32, which essentially corresponds to the negative shape of the star section 34. The supporting die 49 preferably has a uniform, hollow cross section along the working axis 46, which is the inverse shape of the star section 34. The reshaping die 48 can be pivoted around the working axis 46 in relation to the supporting die 49. In the basic position, the cross section at the narrowest point of the reshaping die 48 and the cross section of the supporting die 49 are oriented in the same angular position; in other words, for a projection along the working direction 47, the smallest hollow cross section of the reshaping die 48 fully covers the hollow cross section of the supporting die 49. Diagram number 50 on the reshaping die 48 and diagram number 51 on the supporting die 49 indicate the angular position. In the basic position, the two diagram numbers point to each other.

The two dies 48 and 49 are pivoted into the basic position. The star section 34 of the semifinished product 30 is inserted into the reshaping die 48 and the supporting die 49 until it is adjacent to the unstructured section 33 in the working direction 47. The semifinished product 30 is not reshaped in the process. The reshaping die 48 can bear against the semifinished product 30 in the direction of rotation 52. The supporting die 49 can bear against the semifinished product 30 counter to the direction of rotation 52.

The twisting process begins near the unstructured section 33 of the semifinished product 30 and continues in the direction of the back face 36 of the semifinished product 30. The reshaping die 48 is pivoted in the direction of rotation 52 in relation to the supporting die 49. The semifinished product 30 is twisted between the reshaping die 48 and the supporting die 49, whereby the semifinished product 30 bears against the reshaping die 48 in the direction of rotation 52, and the semifinished product 30 bears against the reshaping die 49 counter to the direction of rotation 52. The pivoting process is depicted based on diagram numbers 50 and 51, which have now shifted. From the perspective of the working direction 47, for example, the direction of rotation 52 is counterclockwise in order to produce a helix 3 with the typical direction of rotation 5.

The star section 34 of the semifinished product 30 is pulled through the two dies 48 and 49 counter to the working direction 47. In the process, the two dies 48 and 49 retain a fixed axial distance. For example, the supporting die 49 touches the reshaping die 48 at all times. In another arrangement, a fixed gap 53 is specified. As an alternative to pulling the semifinished product 30, the two dies 48 and 49 can be moved in relation to the surrounding space. The two dies 48 and 49 are pivoted while being pulled out as described above. The relative pivoting angle 54 that the reshaping die 48 is pivoted around in relation to the basic position can be constant. The pivoting angle 54 is not equal to zero and is at least great enough for the star section 34 to be plastically shaped between the reshaping die 48 and the supporting die 49. A suitable pivoting angle 54 can depend on the steel used for the semifinished product 30, the desired helix gradient 19, and the gap 53. For example, a suitable pivoting angle 54 ranges from 10 degrees to 90 degrees, preferably less than 50 degrees, and preferably with the total of the pivoting angle 54 and the desired helix gradient 19 between 80 degrees and 100 degrees. The pivoting angle 54 can also be varied during the process of pulling out in order to implement a greater helix gradient 19 near the drill bit head 2, for example.

The semifinished product 30 is cold reshaped through the testing process. The semifinished product 30 is at around room temperature at the beginning of the twisting process. The twisting process can warm up the semifinished product 30, but its temperature remains well below the recrystallization temperature of steel. Typically, the twisting process takes place at a temperature of 10 degrees Centigrade (° C.) to 80° C.

The rolling process 39 directly preceding the twisting process is also a cold reshaping process that reduces the ductility of the surface. However, the twisting process is carried out directly with the cold-reshaped semifinished product 30 with the hardened surface.

Figure 9:
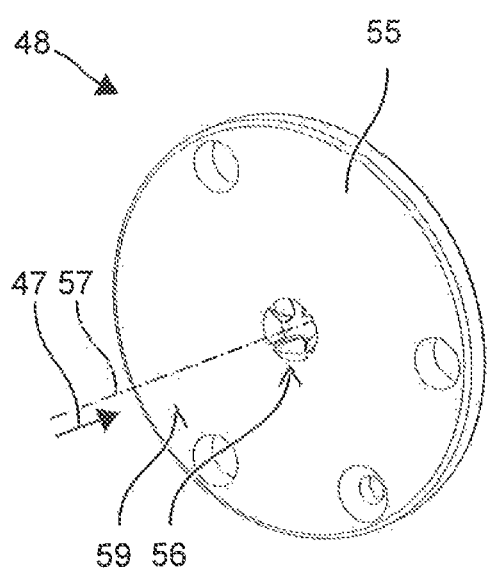
FIG. 9: a reshaping die.
Figure 11:
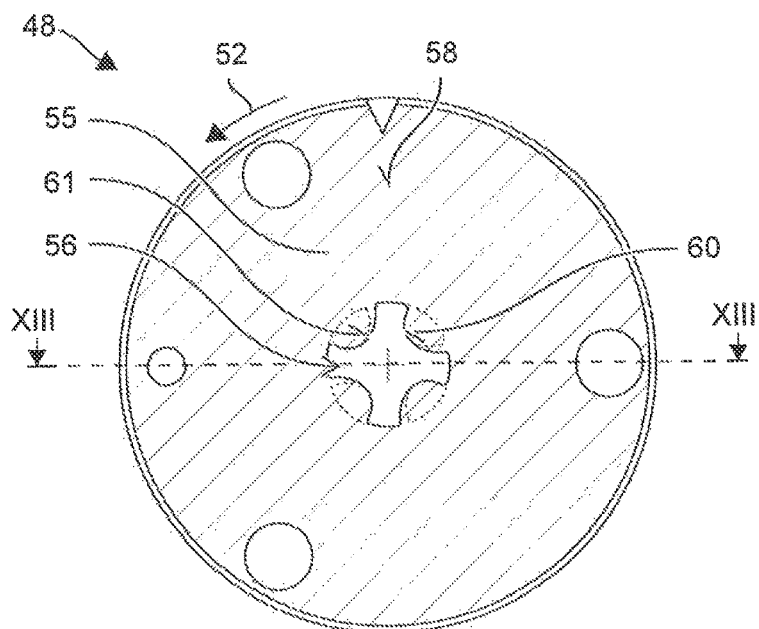
FIG. 11: a front side of the reforming die.
Figure 12:
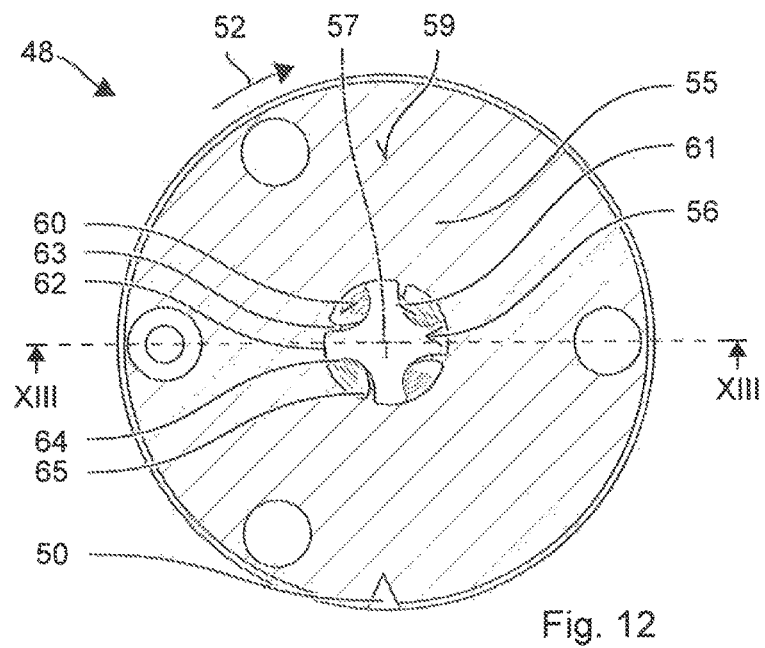
FIG. 12: a back side of the reforming die.

The reshaping die 48 has a base body 55 in an arbitrary design, such as cylindrical (FIG. 9). A profiled cavity 56 extends along a die axis 57, such as the cylinder axis, from a front side 58 (FIG. 11) to a back side 59 (FIG. 12) of the base body 55. The reshaping die 48 is pushed onto the semifinished product 30 with its front side 58 facing the front face 35 of the semifinished product 30 and its back side 59 facing the back face 36 of the semifinished product 30. The die axis 57 coincides with the longitudinal axis 32 of the semifinished product 30.

The cavity 56 grows continuously larger moving from the front side 58 to the direction of the back side 59, i.e., in the working direction 47. The front opening at the front side 58 has the narrowest hollow cross section; the rear opening at the back side 59 has the largest hollow cross section. The front opening is star-shaped. The star shape largely corresponds to the cross section of the star section 34 of the semifinished product 30. The front opening is the inverse shape with respect to the cross section through the longitudinal ribs 31 and the longitudinal grooves 37. The cavity 56 has following interior surfaces 60 that face towards the direction of rotation 52 and leading interior surfaces 61 that face away from the direction of rotation 52. The cavity 56 with the four points 62 in the example has four following interior surfaces 60 and four leading interior surfaces 61, which follow each other in alternation around the cavity 56. Looking from the direction of rotation 52, the following interior surfaces 60 each end at the tips 62, while the leading interior surfaces 61 begin at the tips of the star-shaped front opening (cf. FIG. 11).

The leading interior surfaces 61 are preferably parallel to the die axis 57. The leading interior surfaces 61 are preferably the inverse shape with respect to the exterior surfaces of the star section 34 of the semifinished product 30 that face towards the direction of rotation 52. The semifinished product 30 can therefore bear flat against the leading interior surfaces 61 and be inserted along the die axis 57 while sliding along the leading interior sections 61.

The following interior surfaces 60 rise helix-shaped from the front side 58 in the direction of rotation 52. The following interior surfaces 60 therefore move away from the opposite leading surfaces 61 in the working direction 47. In the direction of rotation 52, the following interior surfaces 60 can press against the helix ribs 12 of the helix 3 being produced. The following interior surfaces 60 have the same chirality (handedness) as the helix 3 being produced—preferably right-handed.

Figure 13:
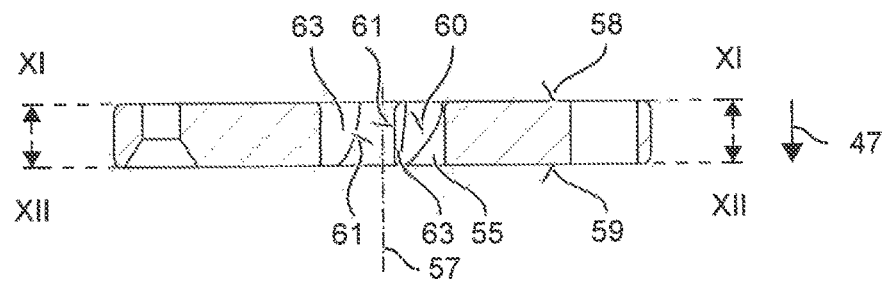
FIG. 13: a cross section through the reshaping die at level XIII-XIII.

A longitudinal section through the cavity 56 along the die axis 57 and at level XIII-XIII is shown in FIG. 13.

The base body 55 has ramps 63 projecting towards the die axis 57. The ramp 63 has a foot surface formed by the front side 58. A head surface parallel to the foot surface limits the ramp 63 at the back side 59. The foot surface is greater than the head surface. The ramp 63 tapers down continuously in the working direction 47. The leading interior surface 61 borders the ramp 63 counter to the direction of rotation 52. The leading interior surface 61 is preferably parallel to the die axis 57. The following interior surface 60 borders the ramp 63 in the direction of rotation 52. The ramp 63 drops in the direction of rotation 52. The ramp 63 is as high as the reshaping die 48 at its front end 64 in the direction of rotation 52 and narrow at its back end 65 in the direction of rotation 52.

The ramps 63 are arranged at the same angular distances around the die axis 57, such as at angular distances of 90 degrees. The ramps 63 can be formed identically; in particular, the ramps 63 lying diametrically across the die axis 57 are identical. In one design, the ramps 63 can have different radial dimensions; for example, their radial distance from the die axis 57 is different.

Diagram number 50 shows the angular orientation of a tip 62 of the star-shaped cavity 56. The position of diagram number 50 is arbitrary, and the same is true of the position of the diagram number 50 directly on the reshaping die 48. The angular orientation of the reshaping die 48 and its cavity 56 are known to a control system for the tool.

Figure 10:
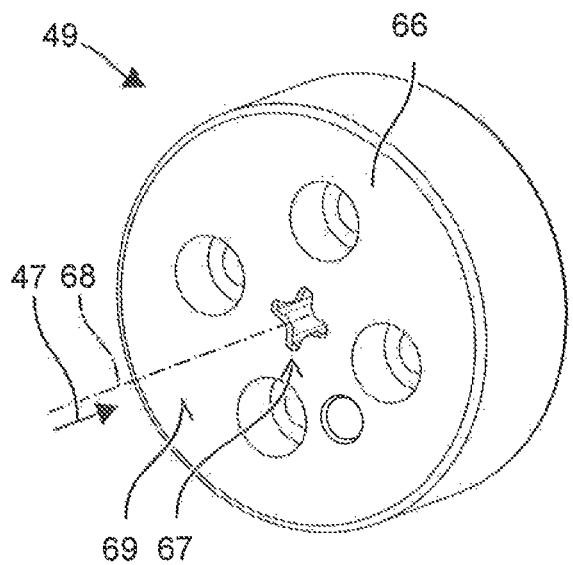
FIG. 10: a supporting die.
Figure 14:
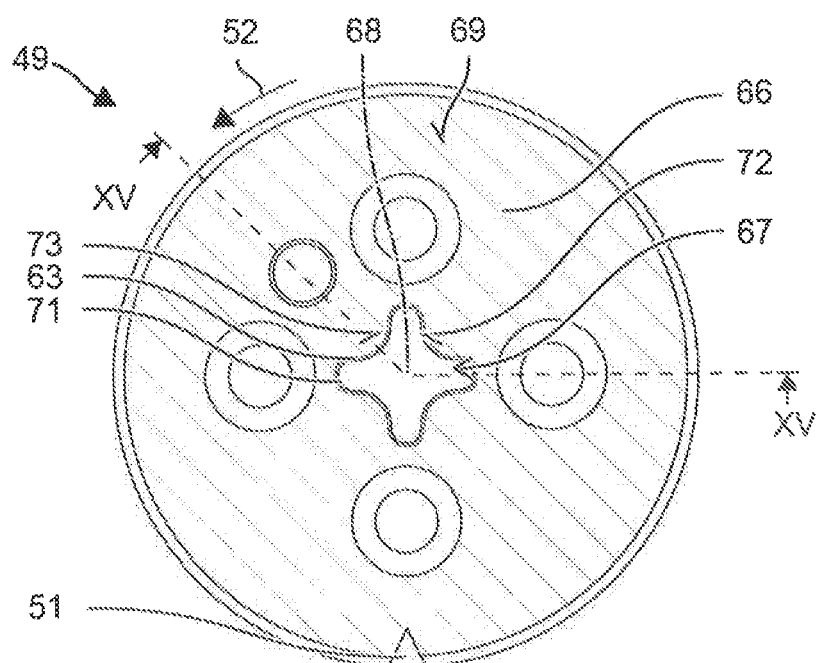
FIG. 14: a front side of the supporting die.

The supporting die 49 has a base body 66 in an arbitrary design, such as cylindrical (FIG. 10). A profiled cavity 67 extends along a die axis 68, such as the cylinder axis, from a front side 69 (FIG. 14) to a back side 70 of the base body 66. After the reshaping die 48, the supporting die 49 is pushed onto the star section 34 of the semifinished product 30 until it is adjoining the reshaping die 48. The reshaping die 48 bears against the back side 59 of the reshaping die 48. The die axis 68 of the supporting die 49 coincides with the longitudinal axis 32 of the semifinished product 30. A back side 70 of the supporting die 49 faces towards the working direction 47.

The front side 69 and the back side 70 of the supporting die 49 are essentially the same. The profiled cavity 67 has a cross section that remains the same along the die axis 68. The cross section is star-shaped—shown in the example with four tips 71 here—and is essentially the inverse shape with respect to the process star section 34 of the semifinished product 30. The cross section largely corresponds to the opening at the back side 59 of the reshaping die 48.

The cavity 67 is enclosed by interior surfaces 72, which face towards the direction of rotation 52, and interior surfaces 73, which face away from the direction of rotation 52. The interior surfaces 72 and 73 are parallel to the die axis 68. The shape of the opposite surfaces 72 and 73 can be mirror-inverted.

Figure 15:
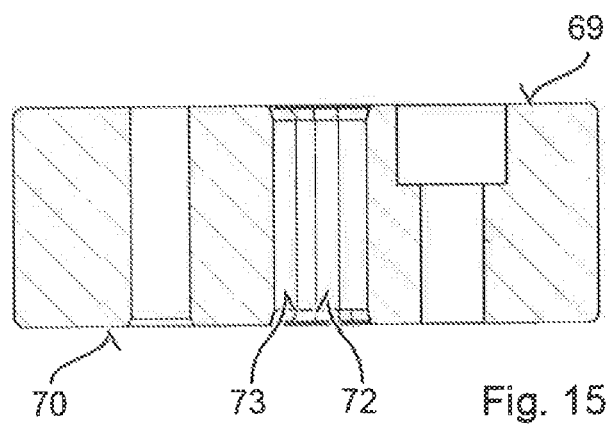
FIG. 15: a section through the supporting die at level XV-XV.

A longitudinal section through the cavity 67 is shown along the cut XV-XV in FIG. 15.

Diagram number 51 shows the angular orientation of a tip 71 of the star-shaped cavity 67. The position of diagram number 51 is arbitrary per se, and also the position of diagram number 51 directly on supporting die 49. The angular orientation of the supporting die 49 and its cavity 67 are known to a control system for the tool.

The second tool stand has an axially movable gripper 74, the reshaping die 48, and the supporting die 49 arranged on the working axis 46.

The gripper 74 holds the semifinished product 30 on the working axis 46. The gripper 74 can be moved back and forth along the working axis 46 by a drive 75. For example, the drive 75 is a pneumatic, hydraulic drive or a mechanical drive with a feed screw. The gripper 74 can pick up the semifinished product 30 and insert it into the two dies 48 and 49 largely without power. The gripper 74 has enough power to pull the semifinished product 30 out of the dies 48 and 49 that are pivoted towards each other. When pulling out the semifinished product 30, the gripper 74 can turn it in the direction of rotation 5 in order to support the twisting process by the reshaping die 48.

The rotary drive 76 turns while continuously pulling out the gripper 74 in the direction of rotation 52. The speed of the rotary drive 76 is coupled to the feed of the axial drive 75. The rotary drive 76 turns the semifinished product 30 360 degrees one time while the feed advances the semifinished product 30 by the multiple of the pitch 20 of the helix 3 that corresponds to the number of the helix segments.

At least one of the two dies 48 and 49 can be pivoted around the working axis 46. For example, the reshaping die 48 is provided with a pivoting drive 77.

The reshaping die 48 and the supporting die 49 can be positioned in the basic position. For example, the dies 48 and 49, provided with diagram numbers 50 and 51 show diagram numbers 50 and 51 in the basic position in the same direction, e.g., illustrated show both diagram numbers 50 and 51. The opening of the cavity 56 on the front side 58 of the reshaping die 48 and the opening of the cavity 67 on the front side 69 of the supporting die 49 are oriented the same way. For example, their tips 62 and 71 point in the same angular directions. With the dies 49 in the example, the interior surfaces 60 of the reshaping die 48 that face towards the direction of rotation 52 and the interior surfaces 72 that face towards the direction of rotation 52 are flush.

The basic position is characterized by the relative angular orientation of the following interior surface 60 of the reshaping die 48 that faces towards the direction of rotation 52 and the interior surface 73 of the supporting die 49 that faces away from the direction of rotation 52. These two opposite interior surfaces 60 and 73 are adjacent to a cavity 67 that corresponds to the cross section through the longitudinal ribs 31. The longitudinal rib 31 can therefore be inserted along the die axes 57 and 68 between the two interior surfaces 60 and 73 without needing any power.

The reshaping die 48 can be pivoted from the basic position in relation to the supporting die 49 by a pivoting angle 54 in the direction of rotation 52, whereby it is irrelevant whether the reshaping die 48 or the supporting die 49 is pivoted in relation to the surrounding area. The pivoting process can be performed by means of a suitable pivoting drive 77, which can produce the necessary torque for the twisting process. For example, the pivoting drive 77 applies force through recesses in the base body 55.

The pivoting angle 54 is equal to zero in the basic position. An example of the pivoting angle 54 is shown based on the two diagram numbers 50 and 51. The pivoting angle 54 is greater than zero in a pivoted position.

In the pivoted position, the cavity 67 bordered by the following interior surface 60 of the reshaping die 48 that faces towards the direction of rotation 52 and the interior surfaces 73 of the supporting die 49 that face away from the direction of rotation 52 is smaller than the cross section of the longitudinal rib 31. The part of the longitudinal rib 31 lying in the reshaping die 48 is twisted by this in the direction of rotation 52.

For example, a suitable pivoting angle 54 ranges between 10 degrees and 90 degrees, preferably less than 50 degrees. The pivoting angle is preferably varied while the two dies 48 and 49 are being pulled off the semifinished product 30. The pivoting angle goes down to zero, particularly at the unstructured section 33 and the back end 36.

The invention claimed is:
1. A method for producing a drill bit with a helix, comprising the steps of:

cold reshaping of a rod-shaped blank to form a semifinished product with three or more longitudinal ribs extending rectilinearly along a longitudinal axis of the semifinished product;

introducing the longitudinal ribs of the semifinished product in a first die and a second die in a working direction, wherein the first die bears against the longitudinal ribs in a direction of rotation around the longitudinal axis and the second die bears against the longitudinal ribs counter to the direction of rotation;

pivoting the first die in the direction of rotation in relation to the second die in order to twist the longitudinal ribs between the first die and the second die;

pulling the longitudinal ribs of the semifinished product through the pivoted first die and the second die counter to the working direction in order to twist the longitudinal ribs; and attaching a drill head to a back end in the working direction;

wherein the first die has interior surfaces that face towards the direction of rotation and are helix-shaped;

wherein the semifinished product is turned in the direction of rotation while pulled out of the first die and the second die.

2. The method according to claim 1, wherein the first die is pivoted around a pivoting angle in relation to the second die wherein the pivoting angle continuously increases during a first section of the helix during a shifting process of the first and second dies and continuously tapers down to zero during a final section of the helix.

* * * * *